United States Patent [19]

Nowobilski et al.

[11] Patent Number: 4,496,633

[45] Date of Patent: Jan. 29, 1985

[54] HIGH DENSITY LOAD BEARING INSULATION PEG

[75] Inventors: Jeffert J. Nowobilski, Orchard Park; William J. Owens, Kenmore, both of N.Y.

[73] Assignee: Union Carbide Corporation, Danbury, Conn.

[21] Appl. No.: 547,561

[22] Filed: Nov. 1, 1983

[51] Int. Cl.³ ............................................. B32B 15/00
[52] U.S. Cl. ..................................... 428/426; 65/4.21; 65/4.4; 65/36; 65/152; 428/280; 428/282; 428/428
[58] Field of Search .................. 65/4.21, 4.4, 36, 146, 65/152; 428/280, 282, 426, 428

[56] References Cited

U.S. PATENT DOCUMENTS

| | | | |
|---|---|---|---|
| 2,745,173 | 5/1956 | Janos | 29/455 |
| 3,094,071 | 6/1963 | Beckman | 102/49 |
| 3,161,265 | 12/1964 | Matsch et al. | 189/34 |
| 3,168,817 | 2/1965 | Beckman et al. | 62/45 |
| 3,289,423 | 12/1966 | Berner et al. | 62/45 |
| 3,575,789 | 4/1971 | Siefert et al. | 65/4.4 X |
| 3,850,601 | 11/1974 | Stapleford et al. | 65/4.4 X |
| 3,961,930 | 6/1976 | Nakagawa et al. | 65/152 |
| 4,310,585 | 1/1982 | Shannon | 428/280 X |
| 4,412,854 | 11/1983 | Layden | 65/36 X |

FOREIGN PATENT DOCUMENTS 976182  10/1950  France ..................................... 65/36

Primary Examiner—Arthur Kellogg
Attorney, Agent, or Firm—Stanley Ktorides

[57] ABSTRACT

A high density peg which can support a large load and exhibits excellent thermal resistance produced by a method wherein the peg is made in compliance with specified conditions of time, temperature and pressure.

20 Claims, 4 Drawing Figures

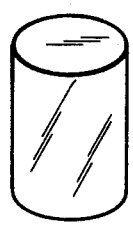
FIG. I(a)
FIG. I(b)
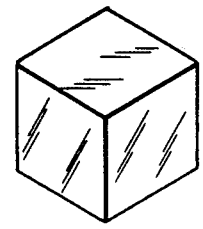
FIG. I(c)
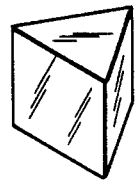

HIGH DENSITY LOAD BEARING INSULATION PEG

The Government has rights in this invention pursuant to Contract No. DE-AC02-80ET5426 awarded by the U.S. Department of Energy.

TECHNICAL FIELD

This invention relates to supports for insulation which have insulating and load bearing capability. In particular this invention relates to pegs of relatively high density which may be used to support non-load bearing high performance insulation and which also exhibit good thermal resistance characteristics.

BACKGROUND ART

High performance insulation is generally characterized by relatively low density because higher densities generally result in poorer heat transfer resistance characteristics due to easier thermal conduction through the denser medium. As a result of this relatively low density, high performance insulation has poor compressive strength and cannot support a significant load. When high performance insulation is required in a load bearing application there is sometimes employed one or more pegs of adequate compressive strength interspersed throughout the insulation to support the load.

Several such load bearing pegs are known to the art. For example, U.S. Pat. No. 3,094,071—Beckman teaches the use of spacers made of porcelain or organic thermal-setting plastic reinforced with fabric or paper. U.S. Pat. No. 3,289,423—Berner teaches the use of pegs of glass fibers made by giving together layers of glass fibers. U.S. Pat. No. 3,161,265—Matsch discloses pegs of glass reinforced phenolic resin and suggests ceramic pegs for high temperature uses.

Although such known pegs are adequate for many uses, they are inadequate for certain high temperature high performance applications. As can be appreciated, thermal transfer through a peg is considerably greater than through the low density insulations. In certain high performance applications the thermal transfer through the pegs is so high as to defeat the purpose of the low density high performance insulation. One such high performance application is an evacuated enclosure for a high temperature battery such as might be used to power an electric vehicle.

Specifically, high density pegs such as those made of porcelain or other ceramics have the disadvantage of relatively high thermal conductivity at elevated temperatures. To reduce such heat transfer, the peg support area must remain small thereby compromising the load bearing capability of the peg. Pegs containing binders, resins or similar reinforcers provide a continuous non-insulator conductive heat path, thus significantly increasing heat transfer through the peg. Furthermore such binders and resins may give off vapors at elevated temperatures which would degrade the vacuum in applications where evacuation of the insulated volume is employed. Such vacuum degradation further reduces the degree of insulation achievable.

It can be appreciated that a successful load bearing insulation peg must have both compressive strength and insulating capability. However those qualities which impart to a peg compressive strength, such as density and reinforcers, also tend to decrease a peg's insulating capability.

It is therefore an object of this invention to provide an improved loading bearing insulation peg.

It is another object of this invention to provide an improved load bearing insulation peg of relatively high density and compressive strength.

It is further object of this invention to provided an improved load bearing insulation peg of relatively high density and compressive strength which has improved thermal resistance characteristics than heretofore available pegs having comparable compressive strength.

SUMMARY OF THE INVENTION

The above and other objects which shall become apparent to one skilled in the art upon a reading of this disclosure are attained by this invention, one aspect of which is:

An insulation peg having a density of from 30 to 80 pounds per cubic foot produced by a process comprising:

(A) providing a stack of substantially binderless glass fiber sheets in an amount sufficient to achieve an insulation peg of desired density from 30 to 80 pounds per cubic foot;

(B) providing a press to compress the stack;

(C) heating the stack and the press to a temperature in the range of from the glass strain temperature to less than the glass softening temperature for a time period sufficient to achieve thermal equilibration of the stack and the press surface;

(D) thereafter compressing the stack by applying a light vertically compressive force of from 2.0 to 20.0 pounds per square inch to the stack for a time period sufficient to produce said desired density and to substantially relieve stress within the compressed stack; and (E) cooling the compressed glass fiber stack to ambient temperature.

Another aspect of this invention is:

A process for producing an insulation peg having a density of from 30 to 80 pounds per cubic foot comprising:

(A) providing a stack of substantially binderless glass fiber sheets in an amount sufficient to achieve an insulation peg of desired density from 30 to 80 pounds per cubic foot;

(B) providing a press to compress the stack;

(C) heating the stack and the press to a temperature in the range of from the glass strain temperature to less than the glass softening temperature for a time period sufficient to achieve thermal equilibration of the stack and the press surface;

(D) thereafter compressing the stack by applying a light vertically compressive force of from 2.0 to 20.0 pounds per square inch to the stack for a time period sufficient to produce said desired density and to substantially relieve stress within the compressed stack; and (E) cooling the compressed glass fiber stack to ambient temperature.

A third aspect of this invention is:

An insulating peg having a density of from 30 to 80 pounds per cubic foot comprised of non-sintered glass fibers and essentially devoid of binder material.

As used herein the term "vertically compressive force" means a force vertical with respect to the stack. Although the stack will generally be oriented vertically with respect to the horizontal ground surface this is not absolutely necessary and the stack may be oriented at any angle to the horizontal.

As used herein the term "press" means any means which can impart a compressive force to the glass fiber stack.

As used herein the term "press surface" means that portion of the press that is intended to contact the stack.

As used herein the term "glass strain temperature" means the temperature at which the glass internal stress is reduced to a commerically acceptable value in about 4 hours. This point corresponds to a glass viscosity of $10^{14.5}$ poises when measured by ASTM No. C336 or C598.

As used herein the term "glass annealing temperature" means the temperature at which the glass internal stress is reduced to a commercially acceptable value in about 15 minutes. This point corresponds to a glass viscosity $10^{13}$ poises when measured by ASTM No. C336 or C598.

As used herein the term "glass softening temperature" is the temperature at which a uniform glass fiber, 0.55 to 0.75 millimeters in diameter and 23.5 centimeters long, elongates under its own weight when the upper 10 centimeters is heated in the manner prescribed by ASTM No. C338.

As used herein the term "thermal equilibration" means that state when the temperatures of all points within a body are within ten percent of the mean temperature of that body.

As used herein the term "peg" means a column whose weight or length (L) is significant when compared to its diameter or lateral dimension (D). In quantitative terms, a cylinder is a peg if its ratio of diameter to length, or aspect ratio, (D/L) is less than 2. A rectangular parallelepiped is a peg if its aspect ratio D/L is less than the square root of pi, where D is the square root of the surface area of a lateral cross-section of the parallelepiped, which would be the length of one side of a square cross section. The peg cross section may be any other suitable shape such as a triangle, a pentagon, a hexagon, etc.

As used herein the term "sinter" means to cause to become a coherent porous mass by heating without melting.

As used herein the term "binder material" means any material which is used to hold the individual glass fibers together.

BRIEF DESCRIPTION OF THE DRAWINGS

FIGS. 1(a), 1(b) and 1(c) are representations of three typical geometrical configurations of the insulation peg of this invention.

DETAILED DESCRIPTION

Figure 2:
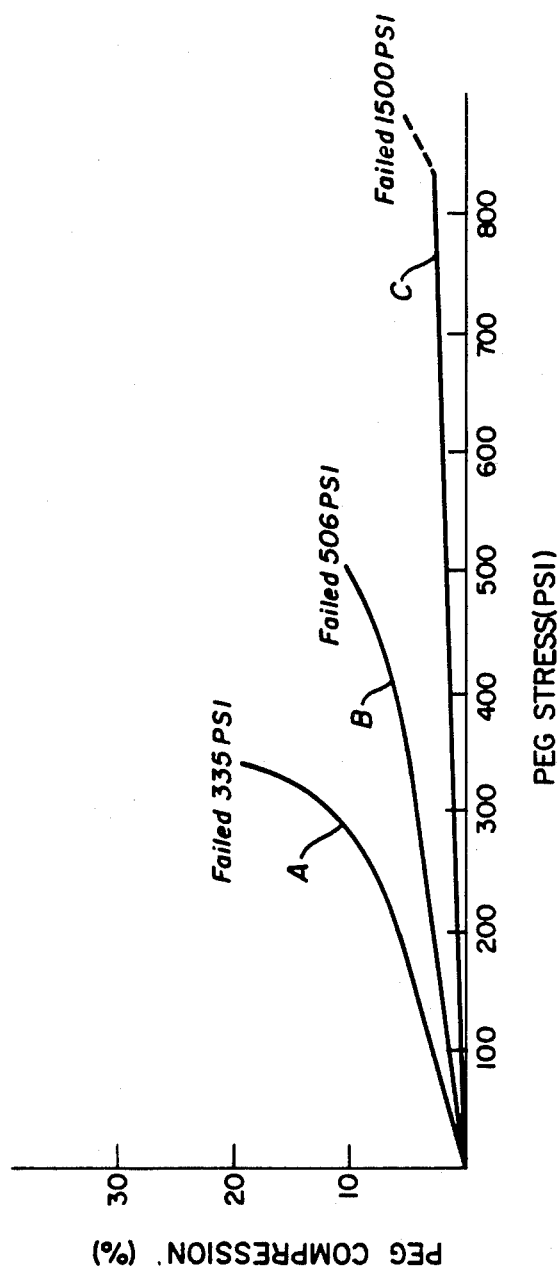
FIG. 2 is a graphical representation of stress versus compression for the insulation peg of this invention and for a commerically available insulation peg.

Glass fiber sheets useful in this invention are well known and commercially available. The sheets are typically made up of criss-crossing glass fibers which are in the same plane. A sheet may be made up of several layers of such glass fibers and typically has a thickness of from 0.002 to 0.10 inch. One commercial designation for such sheets is Manniglas 1400 produced by Manning Paper Company.

The diameter of the glass fibers which make up these glass fiber sheets can be from 0.2 to 13 microns and preferably is from 1 to 5 microns. The glass fiber sheets may also contain an opacifier such as titanium dioxide powder which serves to reduce radiactive heat transfer through the glass fiber sheet.

The glass fiber sheets also generally contain a binder to hold the individual fibers together in sheet form. The binder may be a common commercial adhesive and is usually polyvinyl alcohol (PVA). It is important that this binder material be essentially completely removed from the glass fiber sheets for the attainment of the maximum benefits of this invention. The binder material, if present, may be removed prior to or during the process of making this invention. One way of removing the binder material from the glass fiber sheets is to heat the sheets at a temperature equal to or up to 400° F. less than the glass strain temperature for a time sufficient to brake out essentially all of the binder material in the glass fiber sheets. For most conventional commercially available glass fiber sheets which contain binder material, such a procedure takes from 2 to 16 hours and generally takes about 4 hours.

The glass fiber sheets are stacked in an amount sufficient to achieve an insulation peg having the desired density of from 30 to 80 pounds per cubic foot (pcf). The desired density for any particular peg will vary depending on the load the peg is anticipated to support. Preferably the insulation peg density is from 35 to 65 pcf. A peg having a density of less than 30 pcf would not have sufficient compressive strength to support non-load bearing insulation under significant load conditions while a peg having a density exceeding 80 pcf would have unacceptably high heat leak and thus defeat the purpose of the high performance non-load bearing insulation.

The press which is useful in the process of this invention is any device which can impart a compressive force vertically to the stack of glass fiber sheets. The press can be quite simple such as a weight placed upon the stack, or it may be more complicated such as a mechanical or electro-mechanical device for imparting pressure. It is important to the successful practice of this invention that the stack of glass fiber sheets be in thermal equilibrium with at least the surface of the press when the light vertically compressive force is applied and that such thermal equilibrium be at a temperature in the range of from the glass strain temperature to less than the glass softening temperature. Such thermal equilibration can be achieved by placing the stack in the press and heating them together, or by heating the press and the stack separately, for some or all of the time required to reach the desired compressing temperature within the defined range, before bringing them together. The binder removal step may conveniently be done during the heating step wherein the stack of glass fiber sheets is brought from ambient temperature to the desired compressing temperature.

As mentioned above, the temperature at which the stack and compressing means are in thermal equilibrium when the light vertically compressive force is applied is from the glass strain temperature to less than the glass softening temperature. Preferably this desired compressing temperature is from at least 100° F. above the glass strain temperature is not greater than 200° F. less than the glass softening temperature. A particularly preferred compressing temperature is the glass annealing temperature. Thermal equilibrium of the stack and the press during compression at a temperature at least at the lower defined limit is important. In this way, shear stresses due to differential thermal expansion do not form, so the structure integrity of the finished peg is not compromised. The upper temperature limit is also important in minimizing the finished peg thermal conductivity. Deformation of the glass fibers resulting in increased fiber contact area will occur when the temperature exceeds the glass softening temperature. It is necessary only that the press surface be in thermal equilibrium with the stack though, of course, it is possible that the entire press be in such thermal equilibrium.

When the stack and the compressing means are in thermal equilibrium at the desired compressing temperature, a light vertically compressive force of from 2.0 to 20.0 psi, preferably from 3.0 to 10.0 psi, is applied to the stack by the press. Heating the glass fibers before compression is very important in minimizing damage or breakage of the fibers. At low temperatures, i.e., temperatures below the glass strain temperature, the glass fibers are brittle. Glass fibers preheated to within the range defined by this invention are able to yield to applied stresses so they are less likely to break. The compressive force required for such preheated glass is much less than would be required to compress the stack at ambient temperature. Broken fibers, that may result from compression at, for example, ambient temperature with a large force, tend to stick up or orient themselves at right angles to the rest of the fibers, resulting in increased thermal conductivity. This is because thermal insulation pegs achieve maximum insulation when the glass fibers are oriented perpendicular to the direction of heat leak. Any broken fibers which are perpendicular to the bulk of the other fibers would serve as a heat conduction pathway and thus lessen the insulating effectiveness of the peg. The light compressive force is also more conducive to maintaining only point contact between glass fibers.

This invention, with the specified light compressive force at the specified temperature, results in a high density insulation peg which is capable of bearing a significant load and which has a minimum of glass fibers broken or damaged. This maximizes the glass fibers which can be oriented perpendicular to the direction of heat leak and thus significantly increases the thermal resistance of the peg relative to that achievable by heretofore available pegs capable of supporting a significant load.

The glass fiber stack is heated under the specified light compressive force for a time period which enables one to compress the stack to attain a high density insulation peg of the the desired density and also allow the compressed glass fiber stack to have a generally uniform temperature so as to relieve the stresses caused by compression to the desired density. This time period can be from 2 to 16 hours and generally is about 4 hours.

When the desired density and requisite temperature uniformity are attained the stack is cooled to ambient temperature. The rate of cooling is not of particular importance, although very rapid cooling, such as by quenching, might cause damage from thermal shock. The stack may be cooled within or removed from the press.

One may produce the insulation pegs of this invention one at a time. However it is preferable that the stacked glass fiber sheets be of sufficient surface area to allow a number of pegs to be made at one time from a single pressing. In such a situation the cooled compressed glass fiber stack would then be cut into a plurality of pegs.

The insulation pegs of this invention may be produced in batch or continuously in a continuous feed oven. When produced in batch the preferred procedure is to stack glass fiber sheets in a press and to heat them together to equilibrate at the desired temperature prior to compression. In a continuous process, such as in a continuous feed oven, the preferred method of carrying out the process of the invention would entail preheating and keeping a number of presses in the oven at the desired compressing temperature, loading a stack of glass fiber sheets into a press at one point of the continuous oven, bringing the stack up to the temperature of the press and into thermal equilibrium with it, and then compressing the stack by applying the light vertically compressive force.

The high density insulation peg produced by the process of this invention contains essentially no binder material and the glass fibers are not sintered in order to hold them together. Instead the glass fibers are compressed together to form the high density peg capable of supporting a significant load, but retain sufficient discreteness to provide excellent heat transfer resistance.

The following examples serve to further illustrate the invention. They are offered for illustrative purposes and are not intended to be limiting.

EXAMPLE 1

Glass fiber sheets (Manniglas 1400 available from Manning Paper Co.) having glass fibers of 3 micron diameter were layered into a stack. The free height of the stack was 6.5 inches high and the stack contained approximately 625 sheets. The stack was placed in a press capable of applying a vertically compressive force of 7.8 psi to the stack. The glass strain temperature of the type of glass used in this example is 950° F. and the softening temperature is 1550° F.

The press and stack were heated from ambient to 1350° F. in about 6 hours during which time the PVA binder of the glass fiber sheets was baked out and the press and stack reach thermal equilibrium at 1350° F. The press and stack were held at 1350° F. for ten hours while the 7.8 psi vertically compressive force was applied to the stack by the press. After ten hours the stack had been compressed to a height of 1.25 inches and there was produced a peg having a density of 37 pcf.

EXAMPLE 2

A procedure similar to that described in Example 1 was carried out with the exception that the vertical compression was carried out at a temperature of 1400° F. and the final height of the stack was 1.0 inch. There was produced a peg having a density of 52 pcf.

Reference is made to FIG. 2 which is a graphical representation of stress versus compression for the pegs produced in Examples 1 and 2 and for a commercially available load bearing peg containing binder and opacifier and having a density of 20 pcf. The stress is measured in pounds per square inch (psi) and the compression in percent. Curve A represents the commercially available peg and Curves B and C represent the pegs of Examples 1 and 2 respectively. As can be seen from FIG. 2 the peg of this invention undergoes less compression at comparable pressure levels than the commercially available peg. Moreover the commercially available peg failed at about 335 psi while the pressure on the peg of Example 1 exceeded 500 psi before it failed and the peg of Example 2 did not fail until a 1500 psi load was applied.

Furthermore, the peg of this invention, although having a density significantly greater than that of the commercially available peg, had a thermal conductivity less than one-half of that of the commercially available peg. Thermal conductivities were calculated by employing a 50 pcf peg in a panel of superinsulation, the thermal conductivity of which is well known. The heat loss of the entire panel was measured, and that quantity of heat leak not attributable to the superinsulation was divided by the total peg surface area to obtain the peg thermal conductivity. The commercially available peg had a thermal conductivity of $1.00 \times 10^{-2}$ BTU/hr. ft. °F. while the 50 pcf peg had a thermal conductivity of only $4.70 \times 10^{-3}$ BTU/hr. ft. °F. Pegs of this invention can generally be expected to have thermal conductivities less than $8.0 \times 10^{-3}$ BTU/hr.ft.°F.

This invention provides one with a high density peg capable of supporting a large load without failure or significant compression, while also exhibiting excellent thermal resistance especially at high temperatures. The peg of this invention also is especially useful for use as a support in an evacuated space since there are no binders or other materials which would volatize, especially at elevated temperatures, to degrade the vacuum. Depending on the load anticipated, one can achieve the desired peg density by choice of fiber diameter and processing conditions of temperature, pressure and time.

One very advantageous use of the high density insulation peg of this invention is as support for high performance non-load bearing insulation forming an evacuated enclosure for a high temperature battery such as might be used to power an electric vehicle.

Although this invention has been described in detail with reference to specific embodiments, it is recognized that there are many other embodiments within the scope of the claims.

We claim:

1. An insulating peg having a density of 30 to 80 pounds per cubic foot produced by a process comprising:
   (A) providing a stack of substantially binderless glass fiber sheets in an amount sufficient to achieve an insulation peg of desired density from 30 to 80 pounds per cubic foot;
   (B) providing a press to compress the stack;
   (C) heating the stack and the press to a temperature in the range of from the glass strain temperature to less than the glass softening temperature for a time sufficient to achieve thermal equilibration of the stack and the press surface;
   (D) thereafter compressing the stack by applying a light vertically compressive force of from 2.0 to 20.0 pounds per square inch to the stack for a time period sufficient to produce said desired density and to substantially relieve stress within the compressed stack; and
   (E) cooling the compressed glass fiber stack to ambient temperature.

2. The peg of claim 1 having a density of from 35 to 65 pounds per cubic foot.

3. The peg of claim 1 wherein step (A) is achieved by heating binder containing glass fiber sheets at a temperature in the range of from equal to, to 400° F. below, the glass strain temperature for a time period sufficient to remove essentially all of the binder material in the glass fiber sheets.

4. The peg of claim 1 wherein a portion of step (C) is accomplished by heating the stack and the press separately.

5. The peg of claim 1 wherein the temperature range of step (C) is from 100° F. greater than the strain temperature to 200° F. less than glass softening temperature.

6. The peg of claim 1 wherein the light vertically compressive force is from 3.0 to 10.0 pounds per square inch.

7. The peg of claim 1 wherein the time period of step (D) is from 2 to 16 hours.

8. The peg of claim 1 wherein the glass fiber sheets are comprised of glass fibers having a diameter of from 0.2 to 13 microns.

9. The peg of claim 1 produced by said process further comprising using glass fiber sheets having a surface area greater than that of a single peg and cutting the cooled compressed glass fiber stack resulting after step (E) into a plurality of pegs.

10. A process for producing an insulation peg having a density of from 30 to 80 pounds per cubic foot comprising:
    (A) providing a stack of substantially binderless glass fiber sheets in an amount sufficient to achieve an insulation peg of desired density from 30 to 80 pounds per cubic foot;
    (B) providing a press to compress the stack;
    (C) heating the stack and the press to a temperature in the range of from the glass strain temperature to less than the glass softening temperature for a time period sufficient to achieve thermal equilibration of the stack and the press surface;
    (D) thereafter compressing the stack by applying a light vertically compressive force of from 2.0 to 20.0 pounds per square inch to the stack for a time period sufficient to produce said desired density and to substantially relieve stress within the compressed stack; and
    (E) cooling the compressed glass fiber stack to ambient temperature.

11. The process of claim 10 wherein said peg has a density of from 35 to 65 pounds per cubic foot.

12. The process of claim 10 wherein step (A) is achieved by heating binder containing glass fiber sheets at a temperature in the range of from equal to, to 400° F. below, the glass strain temperature for a time period sufficient to remove essentially all of the binder material in the glass fiber sheets.

13. The process of claim 10 wherein a portion of step (C) is accomplished by heating the stack and the press separately.

14. The process of claim 10 wherein the temperature range of step (C) is from 100° F. greater than the strain temperature to 200° F. less than glass softening temperature.

15. The process of claim 10 wherein the light vertically compressive force is from 3.0 to 10.0 pounds per square inch.

16. The process of claim 10 wherein the time period of step (D) is from 2 to 16 hours.

17. The process of claim 10 wherein the glass fiber sheets are comprised of glass fibers having a diameter of from 0.2 to 13 microns.

18. The process of claim 10 further comprising using glass fber sheets having a surface area greater than that of a single peg and cutting the cooled compressed glass fiber stack resulting after step (E) into a plurality of pegs.

19. An insulation peg having a density of from 30 to 80 pounds per cubic foot comprised of non-sintered glass fibers and essentially devoid of binder material.

20. The insulation peg of claim 19 having a density of from 35 to 65 pounds per cubic foot.

* * * * *

UNITED STATES PATENT AND TRADEMARK OFFICE
CERTIFICATE OF CORRECTION

PATENT NO. : 4,496,633
DATED : January 29, 1985
INVENTOR(S) : J.J. Nowobilski et al It is certified that error appears in the above-identified patent and that said Letters Patent is hereby corrected as shown below:

In column 1, line 34, delete "giving" and insert therefor --gluing--.

In column 3, line 31, delete "weight" and insert therefor --height--.

In column 4, line 16, delete "brake" and insert therefor --bake--.

In column 5, line 1, delete "structure" and insert therefor --structural--.

In claim 18, line 2, delete "fber" and insert therefor --fiber--.

Signed and Sealed this

Second Day of July 1985

[SEAL]

Attest:

DONALD J. QUIGG

Attesting Officer     Acting Commissioner of Patents and Trademarks